(12) United States Patent
Manik et al.

(10) Patent No.: US 9,890,290 B2
(45) Date of Patent: Feb. 13, 2018

(54) COATING COMPOSITIONS AND MULTI-LAYERED FILMS FOR EASY-TO-CLEAN SURFACES

(71) Applicant: 3M INNOVATIVE PROPERTIES COMPANY, St. Paul, MN (US)

(72) Inventors: Gaurav Manik, Muzaffarnagar (IN); Chetan P. Jariwala, Woodbury, MN (US); Ruchi Pandey, Bangalore (IN); Prabha Hegde, Bangalore (IN); Sathyanarayanan Gururamakrishnan, Bangalore (IN); Rachita Pradeep, Bangalore (IN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 9 days.

(21) Appl. No.: 14/653,496

(22) PCT Filed: Dec. 9, 2013

(86) PCT No.: PCT/US2013/073897
§ 371 (c)(1),
(2) Date: Jun. 18, 2015

(87) PCT Pub. No.: WO2014/099448
PCT Pub. Date: Jun. 26, 2014

(65) Prior Publication Data
US 2015/0344704 A1    Dec. 3, 2015

(30) Foreign Application Priority Data

Dec. 19, 2012 (IN) .......................... 5316/CHE/2012

(51) Int. Cl.
*C09D 5/16* (2006.01)
*C09D 175/12* (2006.01)
(Continued)

(52) U.S. Cl.
CPC ............ *C09D 5/1668* (2013.01); *B08B 17/04* (2013.01); *C08G 65/007* (2013.01);
(Continued)

(58) Field of Classification Search
CPC combination set(s) only.
See application file for complete search history.

(56) References Cited

U.S. PATENT DOCUMENTS 3,250,807 A   5/1966  Fritz
3,250,808 A   5/1966  Moore
(Continued)

FOREIGN PATENT DOCUMENTS

EP       1059320      12/2000
JP       05-117480    *  5/1993
(Continued)

OTHER PUBLICATIONS

Caplus/wpix/japio abstracts and machine translation of JP 05-117480, May 1993.*
(Continued)

*Primary Examiner* — Erma Cameron

(57) ABSTRACT

A coating composition and a multi-layered film, both of which include a fluoropolymer and a water-soluble polymer.

8 Claims, 1 Drawing Sheet

(51) Int. Cl.

| | | |
|---|---|---|
| *B08B 17/04* | (2006.01) | |
| *C09D 101/02* | (2006.01) | |
| *C09D 103/02* | (2006.01) | |
| *C09D 129/04* | (2006.01) | |
| *C09D 131/04* | (2006.01) | |
| *C09D 139/06* | (2006.01) | |
| *C09D 171/00* | (2006.01) | |
| *C09J 7/02* | (2006.01) | |
| *C08G 65/00* | (2006.01) | |
| *C08G 65/336* | (2006.01) | |
| *C09D 5/00* | (2006.01) | |
| *B05D 5/08* | (2006.01) | |
| *B08B 17/06* | (2006.01) | |
| *C08G 18/28* | (2006.01) | |
| *C09D 175/04* | (2006.01) | |

(52) U.S. Cl.
CPC ............ *C08G 65/336* (2013.01); *C09D 5/00* (2013.01); *C09D 101/02* (2013.01); *C09D 103/02* (2013.01); *C09D 129/04* (2013.01); *C09D 131/04* (2013.01); *C09D 139/06* (2013.01); *C09D 171/00* (2013.01); *C09D 175/12* (2013.01); *C09J 7/0296* (2013.01); *B05D 5/083* (2013.01); *B08B 17/06* (2013.01); *C08G 18/289* (2013.01); *C08G 18/2885* (2013.01); *C08G 2650/48* (2013.01); *C09D 175/04* (2013.01); *C09J 2427/006* (2013.01); *Y10T 428/14* (2015.01)

(56) References Cited

U.S. PATENT DOCUMENTS

| | | | |
|---|---|---|---|
| 3,865,770 A | 2/1975 | Blake | |
| 3,882,193 A | 5/1975 | Rice | |
| 5,418,006 A | 5/1995 | Roth | |
| 5,603,992 A * | 2/1997 | Woodhall | B05D 5/00 427/155 |
| 5,744,537 A | 4/1998 | Brunsvold | |
| 5,972,472 A | 10/1999 | Uschold | |
| 6,448,313 B1 | 9/2002 | Patel | |
| 6,923,921 B2 | 8/2005 | Flynn | |
| 7,094,829 B2 | 8/2006 | Audenaert | |
| 8,030,430 B2 | 10/2011 | Fan | |
| 8,080,170 B2 | 12/2011 | Dams | |
| 8,501,641 B2 | 8/2013 | Iyer | |
| 2002/0071959 A1 | 6/2002 | Yamaguchi | |
| 2002/0192380 A1 | 12/2002 | Elsbernd | |
| 2005/0008784 A1* | 1/2005 | Martin | B08B 7/0035 427/393.4 |
| 2005/0096244 A1* | 5/2005 | Audenaert | C08G 65/007 510/356 |
| 2007/0141114 A1 | 6/2007 | Muisener | |
| 2008/0146734 A1 | 6/2008 | Youngblood | |
| 2008/0188606 A1 | 8/2008 | Asada | |
| 2008/0317949 A1 | 12/2008 | Edgington | |
| 2009/0197090 A1* | 8/2009 | Hahn | C08G 65/007 428/418 |
| 2010/0167978 A1* | 7/2010 | Iyer | C11D 3/162 510/433 |
| 2010/0219367 A1* | 9/2010 | Dams | C07F 7/1836 252/8.62 |

FOREIGN PATENT DOCUMENTS

| | | |
|---|---|---|
| JP | 2006-347062 | 12/2006 |
| WO | WO 1998-51726 | 11/1998 |
| WO | WO 1998-54397 | 12/1998 |
| WO | WO 99/51430 | 10/1999 |
| WO | WO 03/099904 | 12/2003 |
| WO | WO 2003-099904 | 12/2003 |
| WO | WO 2003-100158 | 12/2003 |
| WO | WO 2009-045771 | 4/2009 |
| WO | WO 2009/045771 | 4/2009 |
| WO | WO 2009-045993 | 4/2009 |
| WO | WO 2009/045993 | 4/2009 |
| WO | WO 2011-122699 | 10/2011 |
| WO | WO 2011-131547 | 10/2011 |

OTHER PUBLICATIONS

International Search Report for PCT International Application No. PCT/US2013/073897 dated Jul. 21, 2014, 5 pages.

* cited by examiner

COATING COMPOSITIONS AND MULTI-LAYERED FILMS FOR EASY-TO-CLEAN SURFACES

BACKGROUND

While there are many coating product formulations that serve the purpose of easy cleanability for surfaces of various kinds, there are few that have the potential to protect from the deposition of oil and dirt (i.e., grime) and yet allow easy removability of the coating when eventually necessary. Surfaces, such as those in a kitchen, e.g., exhaust and hood fans, plates, trays, etc., are exposed to oil, and attract dirt to form a thick and difficult-to-clean grime. Except for the use of harsh cleaning products and significant cleaning time, there are few products to address this problem. Because such surfaces are difficult to clean, they may not get cleaned during their entire life cycle, resulting in premature failure.

SUMMARY

The present disclosure provides a coating composition and a multi-layered film that can prevent the surfaces to which they are applied from getting oily. As a result, the surfaces attract less dirt than control or non-coated surfaces. Furthermore, when dirt does collect, such coated surfaces can be more easily cleaned (e.g., using a simple wet cloth, water wash, or water dipping depending upon the harshness of the grime) due to the sacrificial components built into the composition and film.

In one embodiment, the present disclosure provides a method of treating a hard surface (e.g., a metal such as stainless steel or aluminum, or a ceramic). The method includes: providing a coating composition that includes: a fluoropolymer; a water-soluble polymer; and water; and applying the coating composition to the hard surface to form a grease-repellant and water-soluble coating. This method is particularly useful on hard surfaces in a kitchen.

In one embodiment, the present disclosure provides a multi-layered film. The film includes: a support liner; a layer comprising a water-soluble adhesive disposed on a surface of the liner; a layer comprising a water-soluble polymer disposed directly on the layer comprising the water-soluble adhesive; and a layer comprising a fluoropolymer; wherein the layers are arranged such that the layer comprising the fluoropolymer forms an outermost layer, or the water-soluble polymer and the fluoropolymer are mixed together to form one layer as an outermost layer.

Herein, a "grease-repellant" coating is one that, when subjected to the Soil Test of the Examples Section, the coating has less than 35% of dirt (in grams) remaining.

Herein, a "water-soluble" coating, a "water-soluble" polymer, and a "water-soluble" adhesive are defined similarly. To determine their water solubility, the coating, or polymer, or adhesive is coated in an amount of 0.1 gram (g) to 0.15 g dry weight on a 5 cm×13 cm (2 inch×5 inch) stainless steel panel. The panel is then completely submerged in 50° C. water while standing motionless in a covered Petri dish. A water-soluble coating/polymer/adhesive is one that is completely removed from the panel within 30 minutes. It is understood that such water-soluble coatings/polymers/adhesives are also able to coat the panel with a continuous uniform film.

The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl group contains 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of alkylene groups include, but are not limited to, methylene, ethylene, 1,3-propylene, 1,2-propylene, 1,4-butylene, 1,4-cyclohexylene, and 1,4-cyclohexyldimethylene.

The term "aryl" refers to a monovalent group that is aromatic and, optionally, carbocyclic. The aryl has at least one aromatic ring and can have one or more additional carbocyclic rings that are fused to the aromatic ring. Any additional rings can be unsaturated, partially saturated, saturated, or aromatic. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "arylene" refers to a divalent group that is aromatic and, optionally, carbocyclic. The arylene has at least one aromatic ring and can have one or more additional carbocyclic rings that are fused to the aromatic ring. Any additional rings can be unsaturated, partially saturated, or saturated. Unless otherwise indicated, arylene groups often have 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group (e.g., as in a benzyl group). The term "alkatyl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

The term "aralkylene" refers to a divalent group that is an alkylene group substituted with an aryl group or an alkylene group attached to an arylenc group. The term "alkarylene" refers to a divalent group that is an arylene group substituted with an alkyl group or an arylene group attached to an alkylene group. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms.

The term "perfluoroether" or "perfluorinated ether" refers to an ether in which all of the C—H bonds are replaced with C—F bonds. It refers to a group or compound having at least two perfluorinated groups (e.g., a perfluoroalkylene and/or perfluoroalkyl) linked with an oxygen atom. There may be more than two perfluoriated groups and thus more than one oxygen atom to link all the perfluorinated groups (i.e., perfluoropolyethers). The perfluorinated groups can be saturated or unsaturated and can be linear, branched, cyclic, or a combination thereof.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term at least one. The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein, in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

When a group is present more than once in a formula described herein, each group is independently selected, whether specifically stated or not. For example, when more than one R group is present in a formula, each R group is independently selected. Furthermore, subgroups contained within these groups are also independently selected. For example, when each R group contains a Y group, each Y is also independently selected.

As used herein, the term "room temperature" refers to a temperature of 20° C. to 25° C. or 22° C. to 25° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF EXEMPLARY EMBODIMENTS

Figure 1:
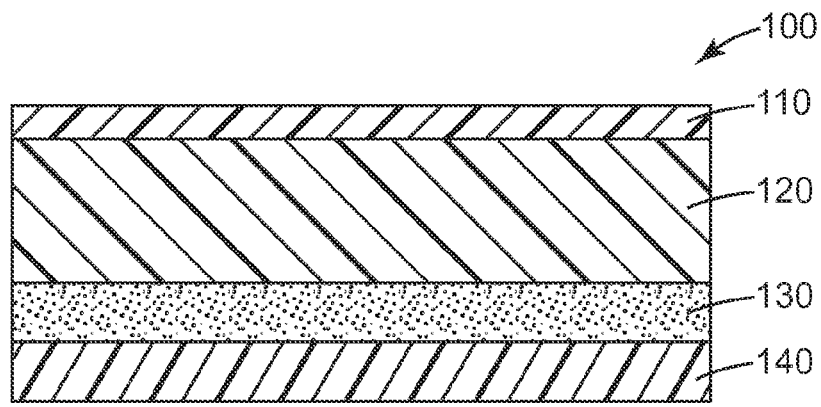
FIG. 1 is a representation of an exemplary multi-layer film of the present disclosure.

The present disclosure provides a coating composition and multi-layered film construction that carries multiple advantages for providing easy-to-clean surfaces. The coating composition and film construction are best suited for surfaces subjected to extremely harsh conditions, for example, the oil and dirt (i.e., grime) deposited on kitchen surfaces and which cannot be cleaned (easily) by available cleaning solutions (mostly based on surfactants). Kitchen surfaces can be made, for example, of ceramic tiles or metals (e.g., aluminum or stainless steel). Such kitchen surfaces include, for example, exhaust fans and other exhaust hood components.

More specifically, the present disclosure provides a coating composition and a multi-layered film that can prevent the surfaces to which they are applied from getting oily. As a result, the surfaces attract less dirt than control or non-coated surfaces. Furthermore, when dirt does collect, such coated surfaces can be more easily cleaned (e.g., using a simple wet cloth, water wash, or water dipping depending upon the harshness of the grime) due to the sacrificial components built into the composition and film.

Both the coating composition and the multi-layered film use a fluoropolymer that provides oil repulsion, and a water-soluble polymer that provides sacrificiality. Thus, the surfaces to which these are applied become repellant to oil, and easy-to-clean. Furthermore, a water-soluble adhesive can also be included, for example, in the multi-layered film construction to absorb oil and dirt from a dirty surface, when applied and removed later.

Fluoropolymer

Suitable fluoropolymers, as used herein, include polymers and oligomers that include fluorine atoms.

In certain embodiments, the fluoropolymers are not fluorosurfactants, as defined by a surface tension of greater than 25 dyne/cm (0.025 N/m) (for 0.1 wt-% of the fluoropolymer in water at 20° C.).

In certain embodiments, the fluoropolymers are cationic.

In certain embodiments, the fluoropolymer is selected from fluorourethanes, fluoro(meth)acrylates, fluorosilanes, and fluoropolymers, wherein the fluoropolymers incorporate greater than 4 monomer units of hexafluoropropylene oxide (HFPO).

In certain embodiments, the fluoropolymer is a fluorosilane, such as the fluorinated ether silane of Formula (I):

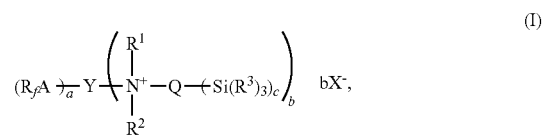

wherein:

a, b, and c are independently integers from 1 to 3;

$R_f$ is a perfluorinated ether group;

A is a linking group (preferably having the formula —$C_dH_{2d}ZC_gH_{2g}$—, wherein d and g are independently integers from 0 to 10, and Z is selected from the group of a covalent bond, a carbonyl group, a sulfonyl group, a carboxamido group, a sulfonamido group, an iminocarbonyl group, an iminosulfonyl group, an oxycarbonyl group, a urea group, a urethane group, a carbonate group, and a carbonyloxy group);

Y is a bridging group (preferably having 1 to 10 carbon atoms, and a valency from 2 to 6) including at least one of an alkylene group, an arylene group, or a combination thereof (e.g., an alkarylene or an aralkylene group));

Q is a connecting group (preferably having 1 to 10 carbons atoms, and a valency from 2 to 4) including at least one of an alkylene group, an arylene group, or a combination thereof (e.g., an alkarylene or an aralkylene group));

$R^1$ and $R^2$ are independently selected from the group of a hydrogen atom, an alkyl group, an aryl group, and a combination thereof (e.g., an aralkyl or an alkaryl group, and preferealy an aralkyl group);

each $R^3$ is independently selected from the group of hydroxy groups, alkoxy groups, acyl groups, acyloxy groups, halo groups, and polyether groups; and $X^-$ is a counter ion selected from the group of inorganic anions, organic anions, and combinations thereof.

Examples of such polymers of Formula (I) are described in greater detail in U.S. Pat. No. 8,080,170.

In the polymers of Formula (I), the monovalent perfluorinated ether group includes at least 1 carbon atom. The perfluorinated ether group may be a linear perfluorinated ether group, or it may include branched or cyclic structures. An oxygen atom in the perfluorinated ether group may be in one or more linear, branched, or cyclic structures. The perfluorinated ether group may have a weight average molecular weight of 200 to 7000, 500 to 5000, 1000 to 5000, 1000 to 4000, 1000 to 3000, or 1000 to 1500. In some embodiments, the perfluorinated ether group has a weight average molecular weight of 300, 400, 600, 800, 1000, 1200, 1400, 1600, 1800, 2000, 2200, 2400, 2600, 2800, or 3000.

In some embodiments of the polymers of Formula (I), the perfluorinated ether group may include a perfluoroalkyl group, a perfluoroalkylene group, or both. The perfluoroalkyl group may include linear, branched, or cyclic structures, or a combination of such structures. In some embodiments, the perfluoroalkyl group includes more than one of a linear, branched, or cyclic structure. Non-limiting examples of perfluoroalkyl groups include perfluoromethyl, perfluoroethyl, perfluoropropyl, perfluorobutyl, perfluoro-2-butyl, perfluorohexyl, and perfluorocyclohexyl, perfluorocyclohexylmethyl groups. The perfluoroalkylene group may include linear, branched, or cyclic structures, or a combination of such structures. In some embodiments, the perfluoroalkylene group includes more than one of a linear, branched, or cyclic structure. Non-limiting examples of perfluoroalkylene groups include perfluoromethylene, perfluoroethylene, and perfluoro-1,2-propylene.

In some embodiments of the polymers of Formula (I), the perfluorinated ether group is a perfluoropolyether group comprising at least two oxygen atoms. The perfluorinated ether group may include a structure $F(C_mF_{2m}O)_nC_pF_{2p}-$, wherein m is an integer of at least 1, n is an integer of at least 2, and p is an integer of at least 1. It is understood that the preparation of perfluorinated ethers comprising such structures may result in a mixture of perfluorinated ethers, each comprising structures having different integer values of m, n, and p. Such mixtures of perfluorinated ethers may have non-integer average values of m, n, and p. In some embodiments, m is an integer from 1 to 12, n is an integer from 2 to 10, and p is an integer from 1 to 6. In some embodiments, m is an integer greater than 2, greater than 4, greater than 6, greater than 8, or greater than 10. In some embodiments, n is an integer greater than 2. In some embodiments, n is an integer greater than 3, greater than 4, greater than 5, greater than 6, greater than 7, greater than 8, or greater than 9. In some embodiments, p is an integer from 1 to 10, 1 to 8, or 1 to 6. In some embodiments, p is an integer of 1, 2, 3, 4, 5, 6, 7, 8, 9, or 10. The substructures $-C_mF_{2m}-$ and $-C_pF_{2p}-$ may independently include one or more of a linear, branched, or cyclic structure.

In some embodiments of the polymers of Formula (I), the perfluorinated ether group may include a structure $F(CF(CF_3)CF_2O)_qCF(CF_3)-$, wherein q is an integer greater than 1. It is understood that the preparation of perfluorinated ethers comprising such structures may result in a mixture of perfluorinated ethers each comprising structures having different integer value of q. Such mixtures of perfluorinated ethers may have non-integer average values of q. In some embodiments, q is an integer greater than 2, greater than 3, greater than 4, greater than 5, greater than 6, greater than 7, greater than 8, greater than 9, greater than 10, greater than 15, greater than 20, or greater than 25. In some embodiments, q is an integer from 2 to 12. The perfluorinated ether group may be derived from, for example, tetrafluoroethylene or hexafluoropropylene, as described in, for example, U.S. Pat. No. 3,882,193 (Rice, et al.) and U.S. Pat. No. 3,250,807 (Fritz et al.). The perfluorinated ether group may be derived from, for example, hexafluoropropylene oxide, as described in, for example, U.S. Pat. No. 6,923,921 (Flynn, et al.) and U.S. Pat. No. 3,250,808 (Moore, Jr., et al.).

In the polymers of Formula (I), the linking group A links the perfluorinated ether group $R_f$ to the bridging group Y. Linking group A has a valency at least sufficient to link the perfluorinated ether group $R_f$ to the bridging group Y. In some embodiments, linking group A has a valency of at least 2. In some embodiments, linking group A has a valency of 2. In some embodiments, linking group A has a valency from 2 to 6.

In some embodiments of the polymers of Formula (I) ILinking group A may be formed as part of the perfluorinated ether group $R_f$, i.e., linking group A may be linked to perfluorinated ether group $R_f$ before it is linked to bridging group Y. Alternatively, linking group A may be formed as part of bridging group Y and may be linked to bridging group Y before it is linked to perfluorinated ether group $R_f$. Alternatively, linking group A may be formed during a chemical reaction of a perfluorinated ether precursor compound and a bridging group Y precursor compound. In this embodiment, linking group A may be linked to perfluorinated ether group $R_f$ and bridging group Y essentially at the same time. In some embodiments, linking group A may be divalent.

In some embodiments of the polymers of Formula (I), the linking group A may have the formula $-C_dH_{2d}ZC_gH_{2g}-$, wherein d and g are independently integers from 0 to 10, and subgroup Z is selected from the group of a covalent bond, a carbonyl group, a sulfonyl group, a carboxamido group, a sulfonamido group, an iminocarbonyl group, an iminosulfonyl group, an oxycarbonyl group, a urea group, a urethane group, a carbonate group, and a carbonyloxy group. In some embodiments, d and g are independently integers from 1 to 4, and Z is selected from the group of a covalent bond, a carbonyl group, a sulfonyl group, a carboxamido group, a sulfonamido group, an iminocarbonyl group, an iminosulfonyl group, an oxycarbonyl group, a urea group, a urethane group, a carbonate group, and a carbonyloxy group. In some embodiments, for example when d and g are both zero, linking group A is includes subgroup Z.

In some embodiments of the polymers of Formula (I), for example when Z is a covalent bond, linking group A includes an alkylene group. The alkylene group may include linear, branched, or cyclic structures. The alkylene group may further include at least one heteroatom, e.g., oxygen, nitrogen, or sulfur. The alkylene group may include at least 1 carbon atom, and up to 2, up to 3, up to 4, up to 5, up to 6, up to 7, up to 8, up to 9, up to 10, up to 14, up to 16, up to 18, or up to 20 carbon atoms. Non-limiting examples of alkylene groups include methylene, ethylene, 1,3-propylene, 1,2-propylene, 1,4-butylene, 1,4-cyclohexylene, and 1,4-cyclohexyldimethylene.

In some embodiments of the polymers of Formula (I), linking group A further includes an arylene group. The arylene group includes one or more aromatic rings. When the arylene group includes more than one aromatic ring, the aromatic rings (which may be the same or different) may be fused, joined by a covalent bond, or joined via, for example, a joining group such as an alkylene group or a heteroatom such as oxygen. The arylene group may include at least one heteroatom, e.g., oxygen, nitrogen, or sulfur. The arylene group may include at least 4 carbon atoms, or at least 5, at least 6, at least 10, or at least 14 carbon atoms. Non-limiting examples of arylene groups include phenyl, 1-naphthyl, 2-naphthyl, 9-anthracenyl, furanyl, and thiophenyl.

In some embodiments of the polymers of Formula (I), linking group A may include an aralkylene group. In some embodiments, linking group A may include an alkarylene group. The aralkylene or alkarylene group may include one or more aromatic rings. When the aralkylene or alkarylene group includes more than one aromatic ring, the aromatic rings (which may be the same or different) may be fused, joined by a covalent bond, or joined via, for example, a joining group such as an alkylene group or a heteroatom such as oxygen. The aralkylene or alkarylene group may include at least one heteroatom, e.g., oxygen, nitrogen, or sulfur. The aralkylene or alkarylene group may include at least 4 carbon atoms, or at least 5, at least 6, at least 10, or at least 14 carbon atoms.

In the polymers of Formula (I), the bridging group Y bridges the linking group A and the cationic nitrogen atom. Bridging group Y has a valency at least sufficient to bridge the linking group A and the cationic nitrogen atom. As shown in Formula (I), for example, bridging group Y may have a valency of at least a+b. In some embodiments, bridging group Y has a valency of 2. In some embodiments, bridging group Y has a valency of greater than 2. In some embodiments, bridging group Y has a valency from 2 to 6. Bridging group Y may include 1 to 10 carbon atoms, and may include at least one of an alkylene group or an arylene group (or a combination thereof).

In some embodiments of the polymers of Formula (I), bridging group Y may be formed as part of a group that includes the cationic nitrogen atom. Alternatively, it may be formed as part of a group that includes a nitrogen atom that will be later quaternized to form the cationic nitrogen atom. Alternatively, it may be formed during a chemical reaction of a linking group A precursor compound and a nitrogen containing compound. In this embodiment, bridging group Y may bridge linking group A and a neutral or cationic nitrogen atom essentially at the same time. In some embodiments, bridging group Y may be divalent.

In some embodiments of the polymers of Formula (I), bridging group Y includes an alkylene group as defined herein for linking group A.

In some embodiments of the polymers of Formula (I), bridging group Y includes an arylene group as defined herein for linking group A.

In some embodiments of the polymers of Formula (I), bridging group Y includes an aralkylene group or an alkarylene group as defined herein for linking group A.

In polymers of Formula (I), the connecting group Q connects the cationic nitrogen atom to the silicon atom. Connecting group Q has a valency at least sufficient to connect the cationic nitrogen atom to the silicon atom. For example, connecting group Q has a valency of at least c+1. In some embodiments, connecting group Q has a valency of 2. In some embodiments, connecting group Q has a valency of greater than 2. In some embodiments, connecting group Q has a valency from 2 to 6. Connecting group Q may have a valency from 2 to 6, may include 1 to 10 carbon atoms, and may include at least one of an alkylene group or an arylene group.

In some embodiments of the polymers of Formula (I), connecting group Q may be formed as part of a group including the cationic nitrogen atom. Alternatively, it may be formed as part of a group including a silicon atom. Alternatively, it may be formed during a chemical reaction of a nitrogen-containing compound and a silicon-containing compound. In this embodiment, connecting group Q connects a neutral or cationic nitrogen atom and a silicon atom essentially at the same time. In some embodiments, connecting group Q may be divalent.

In some embodiments of the polymers of Formula (I), connecting group Q includes an alkylene group. The alkylene group may include linear, branched, or cyclic structures. The alkylene group may include at least one heteroatom, e.g., oxygen, nitrogen, or sulfur. The alkylene group may include at least 1 carbon atom, or up to 2, up to 3, up to 4, up to 5, up to 6, up to 7, up to 8, up to 9, up to 10, up to 14, up to 16, up to 18, or up to 20 carbon atoms. In some embodiments, connecting group Q includes at least one oxyalkylene group. In some embodiments, connecting group Q includes a poly(oxyalkylene) group, for example, a poly(oxyethylene) group. The alkylene group may include more than 20 carbon atoms. Non-limiting examples of alkylene groups include methylene, ethylene, 1,3-propylene, 1,2-propylene, 1,4-butylene, 1,4-cyclohexylene, and 1,4-cyclohexyldimethylene.

In some embodiments of the polymers of Formula (I), connecting group Q includes an arylene group as defined herein for linking group A.

In some embodiments of the polymers of Formula (I), connecting group Q includes an aralkylene or an alkarylene group as defined herein for linking group A.

In the polymers of Formula (I), $R^1$ and $R^2$ are bonded to the cationic nitrogen atom. Each $R^1$ and $R^2$ may be independently selected from the group of a hydrogen atom, an alkyl group, an aryl group and an aralkyl group. When either or both of $R^1$ or $R^2$ is an alkyl group, the alkyl group may include 1 carbon atom, more than 1 carbon atom, more than 2 carbon atoms, more than 4 carbons atoms, more than 6 carbon atoms, more than 8 carbon atoms, more than 10 carbon atoms, more than 16 carbon atoms, or more than 20 carbon atoms. In some embodiments, the alkyl group includes 1 to 8 carbon atoms. In some embodiments, the alkyl group includes a straight chain alkyl group. In other embodiments, the alkyl group includes a branched alkyl group. In still other embodiments, the alkyl group includes a cyclic alkyl group. When each of $R^1$ and $R^2$ includes an alkyl group, $R^1$ and $R^2$ may include the same alkyl group, or $R^1$ and $R^2$ may include different alkyl groups. Non-limiting examples of alkyl groups include methyl, ethyl, 1-propyl, iso-propyl, butyl, iso-butyl, sec-butyl, pentyl, iso-pentyl, neo-pentyl, hexyl, 2-ethylhexyl, octyl, decyl, undecyl, dodecyl, tetradecyl, pentadecyl, octadecyl, cyclohexyl, 4-methylcyclohexyl, cyclohexylmethyl, cyclopenyl, and cyclooctyl.

In some embodiments of the polymers of Formula (I), when either or both of $R^1$ or $R^2$ is an aryl group, the aryl group may include one arene ring or more than one arene ring. Arene rings may include up to 6 carbon atoms, up to 8 carbon atoms, up to 10 carbon atoms, up to 12 carbon atoms, up to 14 carbon atoms, up to 16 carbon atoms, or up to 18 carbon atoms. Arene rings may include a heteroatom, for example, nitrogen, oxygen, or sulfur. If more than one arene ring is present in an aryl group, the arene rings may be fused together, or they may be joined by a chemical bond. When each of $R^1$ and $R^2$ includes an aryl group, $R^1$ and $R^2$ may include the same aryl group or different aryl groups. Non-limiting examples of aryl groups include substituted and unsubstituted phenyl, 1-naphthyl, 2-naphthyl, 9-anthracenyl, and biphenyl.

In some embodiments of the polymers of Formula (I), when either or both of $R^1$ or $R^2$ are an aralkyl group, the aralkyl group may include one arene ring or more than one arene ring. The aralkyl group may include up to 6 carbon atoms, up to 8 carbon atoms, up to 10 carbon atoms, up to 12 carbon atoms, up to 14 carbon atoms, up to 16 carbon atoms, up to 18 carbon atoms, or up to 20 carbon atoms. If more than one arene ring is present in the aralkyl group, the arene rings may be fused together, or they may be joined by a chemical bond. Arene rings may include a heteroatom, for example, nitrogen, oxygen, or sulfur. When each of $R^1$ and $R^2$ includes an aralkyl group, $R^1$ and $R^2$ may include the same aralkyl group, or $R^1$ and $R^2$ may include different aralkyl groups. Non-limiting examples of aralkyl groups include benzyl, 1-phenylethyl, 2-phenylethyl, 3-phenylpropyl, 2-naphthylethyl, and 9-anthracenylmethyl.

In the polymers of Formula (I), each $R^3$ is independently bonded to the silicon atom. In some embodiments, each $R^3$ is independently selected from the group of hydroxy groups, alkoxy groups, acyl groups, acyloxy groups, halo groups, and polyether groups. In some embodiments, at least one $R^3$ is independently bonded to the silicon atom via a hydrolyzable bond. In this context, "bonded via a hydrolyzable bond" refers to the reactivity of the $R^3$-silicon bond with water, i.e., to a bond that is capable of undergoing a hydrolysis reaction. In some embodiments, $R^3$ is bonded to the silicon atom via a bond including a carbon atom, i.e., $R^3$ includes a carbon atom bonded to the silicon atom. In some embodiments, $R^3$ is bonded to the silicon atom via a bond including an atom other than a carbon atom. In some embodiments, $R^3$ is bonded to the silicon atom via a bond including an oxygen atom, i.e., $R^3$ includes an oxygen atom bonded to the silicon atom. In some embodiments, $R^3$ is bonded to the silicon atom via a bond including a nitrogen atom, i.e., $R^3$ includes a nitrogen atom bonded to the silicon atom.

In some embodiments of the polymers of Formula (I), each $R^3$ may independently be a non-ionic group or an ionic group. The ionic group may be cationic, anionic, or zwitterionic. Non-limiting examples of non-ionic groups include hydroxy, alkoxy, acyl, acyloxy, halo, and polyether groups. Alkoxy groups include, for example, methoxy and ethoxy groups. Halo groups include, for example, chloro, bromo, and iodo groups. Acyl groups include, for example, acetyl, propionyl, and benzoyl groups. Acyloxy groups include, for example, acetoxy and propionoxy groups. Polyether groups may include oxyalkylene groups, for example groups having the formula $(OC_vH_{2v})$, where v is an integer from 1 to 6. Non-limiting examples of polyether groups comprising oxyalkylene groups include poly(oxymethylene), poly(oxyethylene), and poly(oxybutylene) groups. In some embodiments, the polyether group includes 1 to 200 oxyalkylene groups. In some embodiments, the polyether group includes 1 to 5, 1 to 10, 1 to 20, 1 to 30, 1 to 40, or 1 to 50 oxyalkylene groups.

In the polymers of Formula (I), non-limiting examples of ionic groups include groups such as —OCH$_2$CH$_2$N$^+$(CH$_3$)$_3$I$^-$, —OCH$_2$CH$_2$N$^+$(CH$_3$)$_3$Cl$^-$, and —OCH$_2$CH$_2$N$^+$(CH$_3$)$_2$CH$_2$CH$_2$CH$_2$SO$_3^-$. In some embodiments, polyether groups including more than one oxyalkylene group further includes a cationic group (e.g., a group including a cationic nitrogen atom), an anionic group, or both a cationic group and an anionic group.

In the polymers of Formula (I), the counter ion $X^-$ may include an organic anion, an inorganic anion, or a combination of organic and inorganic anions. In some embodiments, counter ion $X^-$ may result from a chemical reaction that forms the cationic nitrogen atom, for example a reaction between an amine and an alkylating agent such as, for example, a chloroalkylsilane, that forms a nitrogen to carbon bond and displaces a chloride ion. In some embodiments, counter ion $X^-$ may result from the protonation of an amine with an acid. Such a reaction can provide a cationic nitrogen atom and the conjugate base of the acid (i.e., the counter ion $X^-$). In some embodiments, counter ion $X^-$ may result from an ion exchange reaction, e.g., a reaction in which one anion is exchanged for another.

In some embodiments of the polymers of Formula (I), counter ion $X^-$ may be selected from the group of a halide (e.g., chloride, bromide, or iodide), sulfate, phosphate, an alkanoate (e.g., acetate or propionate), an alkyl sulfonate, an aryl sulfonate (e.g., benzenesulfonate), an alkyl phosphonate, an aryl phosphonate, a fluorinated alkanoate (e.g., trifluoroacetate), a fluorinated alkyl sulfonate (e.g., trifluoromethanesulfonate), a fluorinated aryl sulfonate (e.g., 4-fluorophenylsulfonate), a fluorinated alkyl sulfonimide (e.g., bis(trifluoromethylsulfonyl)imide), a fluorinated alkyl methide (e.g., tris(trifluoromethylsulfonyl)methide, and combinations thereof.

In certain embodiments of the compositions and multi-layered films of the present disclosure, the fluoropolymer includes at least one perfluorinated (C4-C6) alkyl group.

In certain embodiments of the compositions and multi-layered films of the present disclosure, the fluoropolymer includes one or more urethane oligomers of at least two polymerized units, wherein said oligomers include the reaction product of components that include:

(a) one or more polyfunctional isocyanate compounds;
(b) one or more polyols;
(c) one or more monoalcohols selected from the group of fluorocarbon monoalcohols, optionally substituted long-chain hydrocarbon monoalcohols, and mixtures thereof; and
(d) one or more silanes of the following Formula (II):

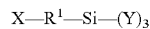

wherein:

X is an isocyanate reactive group selected from —NH$_2$, —SH, —OH, or —NRH, where R is selected from the group of phenyl, straight and branched aliphatic (i.e., a saturated or unsaturated linear or branched hydrocarbon group), alicyclic (i.e., a cyclic hydrocarbon group having properties resembling those of aliphatic groups), and aliphatic ester groups;

$R^1$ is an alkylene, heteroalkylene, aralkylene, or heteroaralkylene group; and each Y is independently a hydroxyl, a hydrolyzable moiety selected from the group of alkoxy, acyloxy, heteroalkyloxy, heteroacyloxy, halo, and oxime, or a non-hydrolyzable moiety selected from the group of phenyl, alicyclic, straight-chain aliphatic, and branched-chain aliphatic;

wherein at least one Y is a hydrolyzable group.

Examples of such polymers of Formula (II) are described in greater detail in U.S. Pat. No. 8,030,430.

In making such urethane oligomers, exemplary polyfunctional isocyanate compounds (a) include those selected from the group of hexamethylene 1,6-diisocyanate (HDI), 1,12-dodecane diisocyanate isophorone diisocyanate, toluene diisocyanate, dicyclohexylmethane 4,4'-diisocyanate, MDI, derivatives of all the aforementioned, including those available under the trade designation DESMODUR N-100, N-3200, N-3300, N-3400, N-3600, and mixtures thereof. Other useful triisocyanates are those obtained by reacting three moles of a diisocyanate with one mole of a triol. For example, toluene diisocyanate, 3-isocyanatomethyl-3,4,4-trimethylcyclohexyl isocyanate, or m-tetramethylxylene diisocyanate can be reacted with 1,1,1-tris(hydroxymethyl) propane to form triisocyanates. The product from the reaction with m-tetramethylxylene diisocyanate is commercially available under the trade designation CYTHANE 3160 (American Cyanamid, Stamford, Conn.).

In making such urethane oligomers, exemplary polyols (b) include those organic polyols that have an average hydroxyl functionality of at least 2 (preferably, 2 to 5, more preferably, 2 to 3, most preferably, 2, as diols are most preferred). The hydroxyl groups can be primary or secondary, with primary hydroxyl groups being preferred for their greater reactivity. Mixtures of diols with polyols that have an average hydroxyl functionality of 2.5 to 5 (preferably, 3 to 4, more preferably, 3) can also be used. It is preferred that such mixtures contain no more than 20 percent by weight of such higher polyols, more preferably no more than 10 percent, and most preferably no more than 5 percent. Preferred mixtures are mixtures of diols and triols. When the polyols of the present disclosure are diols, the diols can be substituted with or contain other groups. Thus, a preferred diol is selected from the group of a branched- or straight-chain hydrocarbon diol, a diol containing at least one water solubilizing group, a fluorinated diol including a monovalent or divalent perfluorinated group, a diol includin a silane group, a polyalkylsiloxane diol, a polyarylsiloxane diol, and mixtures thereof. Solubilizing groups include carboxylate, sulfate, sulfonate, phosphate, phosphonate, ammonium, quaternary ammonium, and the like. The polyols with solubilizing groups are especially preferred. Preferred polyols include N-bis(2-hydroxyethyl)perfluorobutylsulfonamide; 1,4-bis(1-hydroxy-1,1-dihydroperfluoropropoxy)perfluoro-n-butane ($HOCH_2CF_2CF_2O(CF_2)_4OCF_2CF_2CH_2OH$).

In making such urethane oligomers, exemplary monoalcohols (c) include fluorine-containing monoalcohols such as:
2-(N-methylperfluorobutanesulfonamido)ethanol,
2-(N-ethylperfluorobutane sulfonamido)ethanol,
2-(N-methylperfluorobutanesulfonamido)propanol,
N-methyl-N-(4-hydroxybutyl)perfluorohexane sulfonamide,
1,1,2,2-tetrahydroperfluorooctanol,
$C_4F_9OC_2F_4OCF_2CH_2OCH_2CH_2OH$,
$C_3F_7CON(H)CH_2CH_2OH$,
$C_3F_7O(CF(CF_3)CF_2O)_{1-36}CF(CF_3)CH_2OH$,
$CF_3O(CF_2CF_2O)_{1-36}CF_2CH_2OH$,
and mixtures thereof.

In making such urethane oligomers, it is additionally preferred that the fluoro group of the monoalcohols (for making such urethane oligomers) contain at least about 40% fluorine by weight, more preferably at least about 50% fluorine by weight.

In making such urethane oligomers, suitable long-chain hydrocarbon monoalcohols include 1-octanol, 1-decanol, 1-dodecanol, 1-tetradecanol, 1-hexadecanol, 1-octadecanol, and the like, and mixtures thereof. Preferred long-chain hydrocarbon monoalcohols have 12 to 16 carbon atoms, with 12 to 14 carbon atoms being more preferred, and 12 carbon atoms being most preferred for water solubility and performance. These long-chain hydrocarbon monoalcohols can be optionally substituted, for example, with groups such as one or more chlorine, bromine, trifluoromethyl, or phenyl groups.

In making such urethane oligomers, exemplary silanes (d) include isocyanate reactive compounds such as:
$H_2NCH_2CH_2CH_2Si(OC_2H_5)_3$,
$H_2NCH_2CH_2CH_2Si(OCH_3)_3$,
$H_2NCH_2CH_2CH_2Si(O-N=C(CH_3)(C_2H_5))_3$,
$HSCH_2CH_2CH_2Si(OCH_3)_3$,
$HO(C_2H_4O)_3C_2H_4N(CH_3)(CH_2)_3Si(OC_4H_9)_3$,
$H_2NCH_2C_6H_4CH_2CH_2Si(OCH_3)_3$,
$HSCH_2CH_2CH_2Si(OCOCH_3)_3$,
$HN(CH_3)CH_2CH_2Si(OCH_3)_3$,
$HSCH_2CH_2CH_2SiCH_3(OCH_3)_2$,
$(H_3CO)_3SiCH_2CH_2CH_2NHCH_2CH_2CH_2Si(OCH_3)_3$,
$HN(CH_3)C_3H_6Si(OCH_3)_3$,
$CH_3CH_2OOCCH_2CH(COOCH_2CH_3)HNC_3H_6Si(OCH_2CH_3)_3$,
$C_6H_5NHC_3H_6Si(OCH_3)_3$,
$H_2NC_3H_6SiCH_3(OCH_2CH_3)_2$,
$HOCH(CH_3)CH_2OCONHC_3H_6Si(OCH_2CH_3)_3$,
$(HOCH_2CH_2)_2NCH_2CH_2CH_2Si(OCH_2CH_3)_3$,
and mixtures thereof.

In making such urethane oligomers, exemplary silanes (d) include hydroxyl-reactive silane compounds include, for example, 3-isocyanatopropyltriethoxysilane, 3-isocyanatopropyltrimethoxysilane, and the like.

In certain embodiments, preferred classes of urethane oligomers are represented by the following general formulas:

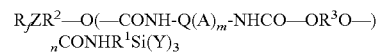

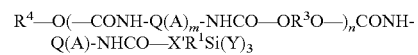

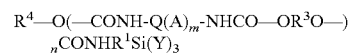

wherein:

$R_fZR^2$— is a residue of at least one of the fluorochemical monoalcohols;

$R_f$ is a perfluoroalkyl group having 3 to about 8 carbon atoms, or a perfluoroheteroalkyl group having 3 to about 50 carbon atoms;

Z is a covalent bond, sulfonamido ($—SO_2NR—$), or carboxamido ($—CONR—$) where R is hydrogen or alkyl;

$R^1$ is an alkylene, heteroalkylene, aralkylene, or heteroaralkylene group;

$R^2$ is a divalent straight- or branched-chain alkylene, cycloalkylene, or heteroalkylene group of 1 to 14 carbon atoms (preferably, 1 to 8 carbon atoms; more preferably, 1 to 4 carbon atoms; most preferably, two carbon atoms; and preferably, $R^2$ is alkylene or heteroalkylene of 1 to 14 carbon atoms);

Q is a multi-valent organic group which is a residue of the polyfunctional isocyanate compound;

$R^3$ is a divalent organic group which is a residue of the polyol and can be optionally substituted with or contain (i) water-solubilizing groups, (ii) perfluorinated groups, or (iii) silane groups;

X' is —O—, —S—, or —N(R)—, wherein R is hydrogen or alkyl;

$R^4$ is an optionally substituted long-chain hydrocarbon derived from the long-chain hydrocarbon monoalcohol;

each Y is independently a hydroxy; a hydrolyzable moiety selected from the group of alkoxy, acyloxy, heteroalkoxy, heteroacyloxy, halo, and oxime; or a non-hydrolyzable moiety selected from the group of phenyl, alicyclic, straight-chain aliphatic, and branched-chain aliphatic, wherein at least one Y is a hydrolyzable moiety;

A is a pendent group derived from a stabilizer or a water solubilizing group, provided that at least one A is a stabilizer;

m is an integer from 0 to 2; and n, which is the number of polymerized units, is an integer from 2 to 10.

Water-Soluble Polymer

Suitable water-soluble polymers are also film-forming polymers. That is, they are polymers that will coat out to form a continous uniform film under the conditions of the Water Solubility Test described in the Examples Section.

Exemplary water-soluble polymers include, but are not limited to, cellulose, polyvinyl alcohol, poly(meth)acrylic acid, polylactic acid, starch, ethylene vinyl alcohol, polyethylene glycol, polyvinyl acetate, polyvinylpyrrolidone, and combinations thereof. Preferred water-soluble polymers are polyvinyl alcohols as listed in the following table.

| | | |
|---|---|---|
| PVA (Mw- 9,000-10,000, 80% hydrolyzed) | Sigma Aldrich | Product number - 360627 |
| PVA (Mw- 30,000-70,000, 87-90% hydrolyzed) | Sigma Aldrich | Product number - P8136 |
| PVA (Mw 85,000-1,24,000, 86-89% hydrolyzed) | S.D. Fine Chemical Limited | Product & pack code- 39791 K05 |

In certain embodiments, the water-soluble polymer has a weight average molecular weight of at least 9,000 Daltons. In certain embodiments, the water-soluble polymer has a weight average molecular weight range of no greater than 124,000 Daltons, or no greater than 45,000 Daltons, or no greater than 10,000 Daltons.

Coating Composition

The present disclosure provides a coating composition that can be used in a method of treating a hard surface (e.g., stainless or aluminum or ceramic) to provide a grease-repellant and water-soluble coating.

The coating composition includes a fluoropolymer, a water-soluble polymer, and water. The fluoropolymer and water-soluble polymer are as described above. Various combinations of fluoropolymers and various combinations of water-soluble polymers can be used, if desired.

In certain embodiments, the coating composition can be in a sprayable form. Alternatively, it can be used in a wipable or dippable form. Thus, it can be used either by a consumer or a manufacturer, on, for example, a stove-top surface.

In certain embodiments, the coating composition can be provided in a two-part system. One part can include the fluoropolymer, and one part can include the water-soluble polymer. Either one of the parts, or both parts, can include the water.

In certain embodiments, the coating composition includes a fluoropolymer in an amount of at least 0.1 wt-%, based on the total weight of the composition. In certain embodiments, the coating composition includes a fluoropolymer in an amount of no greater than 1.0 wt-%, or no greater than 0.5 wt-%, or no greater than 0.2 wt-%, based on the total weight of the coating composition.

In certain embodiments, the coating composition includes a water-soluble polymer in an amount of at least 10 wt-%, based on the total weight of the coating composition. In certain embodiments, the coating composition includes a water-soluble polymer in an amount of no greater than 20 wt-%, or no greater than 15 wt-%, or no greater than 12 wt-%, based on the total weight of the coating composition.

In certain embodiments, the coating composition includes water in an amount of at least 80 wt-%, based on the total weight of the coating composition. In certain embodiments, the coating composition includes water in an amount of no greater than 90 wt-%, based on the total weight of the coating composition.

In some cases, no organic solvent is used in the coating composition.

In certain embodiments, the coating composition can also include a water-miscible organic solvent. For a two-part system, this optional component can be in either one of the parts, or both parts. Examples of suitable water-miscible organic solvents include isopropanol, ethanol, methanol, n-butanol, dipropylene glycol monomethyl ether, dipropylene glycol, and combinations thereof. If used, the water-miscible organic solvent is typically present in an amount of at least 10 wt-%, based on the total weight of the coating composition. If used, the water-miscible organic solvent is typically present in an amount of no greater than 50 wt-%, based on the total weight of the coating composition.

In certain embodiments, the coating composition includes a fluoropolymer in an amount of 0.1 wt-% to 1.0 wt-%, a water-soluble polymer in an amount of 10 wt-% to 20 wt-%, and water in an amount of 80 wt-% to 90 wt-%, based on the total weight of the coating composition. It will be understood by one of skill in the art that the components will be selected to be within these ranges such that the total amount of components adds up to 100%.

In certain embodiments, the coating composition can also include one or more additives. For a two-part system, these optional additives can be in either one of the parts, or both parts. Examples of suitable additives include fragrances, preservatives, pigments, stabilizers, anti-foaming agents, anti-soiling agents, and combinations thereof. If used, the amount of each of these additives is readily determined by one of skill in the art.

The coating composition can be applied using any of a variety of solvent coating techniques (e.g., spraying, dipping, painting, etc.). It can be simply dried at room temperature to remove at least a portion of the water or organic solvent that may be included. If desired, the coating composition can be heated, after coating, to a temperature above room temperature (e.g., 130° C.) for improved performance.

Multi-Layered Film

The present disclosure provides a multi-layered film (i.e., multi-layer film). This film includes: a support liner; a layer that includes a water-soluble adhesive disposed on a surface of the liner; a layer that includes a water-soluble polymer disposed directly on the layer that includes the water-soluble adhesive; and a layer that includes a fluoropolymer. Such layers are preferably continuous (i.e., not patterned).

Figure 2:
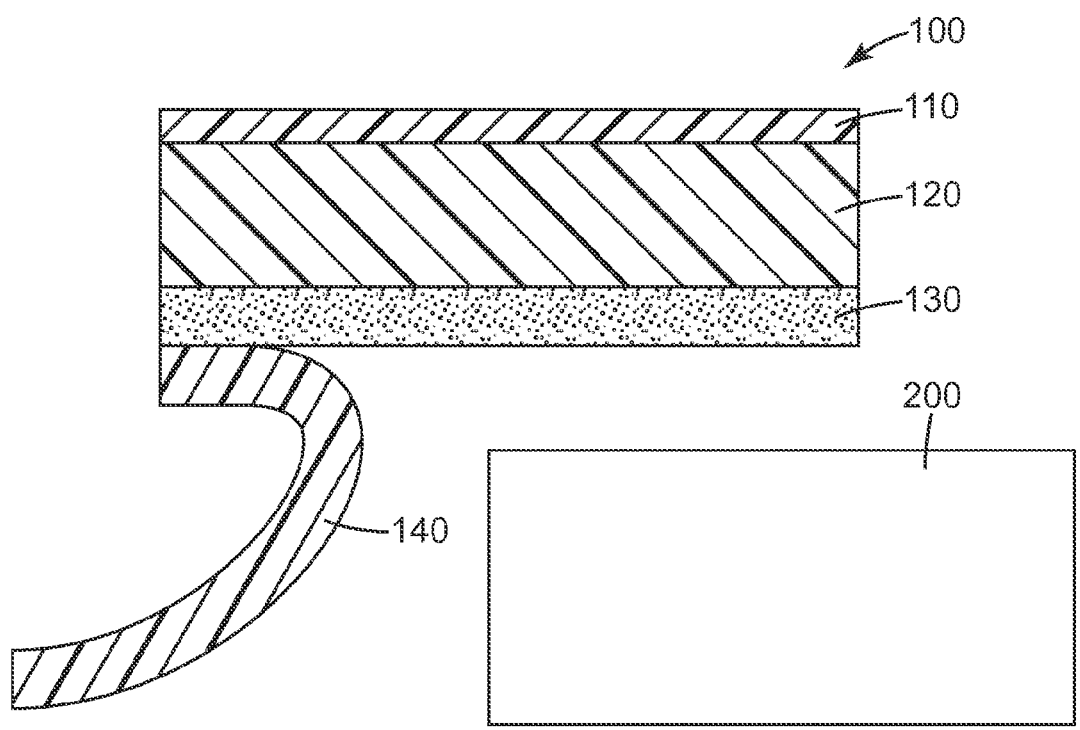
FIG. 2 is a representation of the exemplary film of FIG. 1 with the liner being removed and the film ready to apply to a substrate.

FIG. 1 is a representation of an exemplary multi-layer film (100) of the present disclosure showing a layer that includes a fluoropolymer (110), a layer that includes a water-soluble polymer (120), a layer that includes a water-soluble adhesive (130), and a support liner (140). FIG. 2 is a representation of the exemplary film of FIG. 1 with the liner (140) being removed and the film applied to a substrate (200).

In certain embodiments, the layers are arranged such that the layer that includes the fluoropolymer forms an outermost layer. In certain embodiments, the water-soluble polymer and the fluoropolymer are mixed together to form one layer as an outermost layer.

The fluoropolymer and water-soluble polymer are as described above. Various combinations of fluoropolymers and various combinations of water-soluble polymer can be used in the multi-layered film, if desired, in mixtures or multiple layers.

In certain embodiments, the layer that includes the fluoropolymer has a thickness of at least 4 microns. In certain embodiments, the layer that includes the fluoropolymer has a thickness of no greater than 8 microns.

In certain embodiments, the layer that includes the water-soluble polymer has a thickness of at least 50 microns, or at least 100 microns. In certain embodiments, the layer that includes the water-soluble polymer has a thickness of no greater than 110 microns.

If the fluoropolymer and water-soluble polymer are mixed together in one layer, typically, the fluoropolymer is present in the layer in an amount of at least 0.1 wt-%, and the water-soluble polymer is present in the layer in an amount of at least 99 wt-%, based on total composition weight. If they are mixed together in one layer, typically, the fluoropolymer is present in the layer in an amount of no greater than 1.0 wt-%, and the water-soluble polymer is present in the layer in an amount of no greater than 99.9 wt-%, based on total composition weight. If desired, the coating composition described herein can be used to form this mixed layer.

In certain embodiments, the layer that includes a mixture of the fluoropolymer and the water-soluble polymer has a thickness of at least 50 microns. In certain embodiments, the layer that includes a mixture of the fluoropolymer and the water-soluble polymer has a thickness of no greater than 110 microns.

The multi-layered film of the present disclosure also includes a layer that includes a water-soluble adhesive. This water-soluble adhesive preferably bonds with oil and grease on the surface to which the multi-layered film is applied, thereby allowing the oil and grease to be at least partially removed (e.g., pulled off with the adhesive) if the multi-layered film is removed. Or, the oil and grease can be washed away completely by dissolving in water along with the water-soluble adhesive.

In certain embodiments, the water-soluble adhesive is a pressure sensitive adhesive. Preferred pressure sensitive adhesives include tackified acrylate pressure sensitive adhesives such as disclosed, for example, in U.S. Pat. No. 3,865,770.

In certain embodiments, the layer that includes the water-soluble adhesive has a thickness of at least 22 microns. In certain embodiments, the layer that includes the water-soluble adhesive has a thickness of no greater than 25 microns.

The multilayer film includes a support liner that is typically resistant to the absorption of moisture, and will withstand sheet conversion without edge curling. An exemplary such liner is is a 120 g polycoat liner, which is double-sided paper laminated with 5-10 grams of polyethylene (PE) on each side, and one side is siliconized. A typical support liner has a thickness of at least 120 microns, and often no greater than 125 microns.

The multilayer film can also include an optional protective liner disposed on the outermost layer of the film. Preferably, the protective film is one that will cling to the outermost layer of the film through static forces. An exemplary such surface protective film is a static-charged polyethylene film available under the trade name 2CK01 from 3M Company. A typical protective film has a thickness of at least 25 microns, and often no greater than 60 microns.

Illustrative Embodiments

1. A method of treating a hard surface, the method comprising:
   providing a coating composition comprising:
   a fluoropolymer;
   a water-soluble polymer; and
   water; and
   applying the coating composition to the hard surface to form a grease-repellant and water-soluble coating.
2. The method of embodiment 1 wherein the fluoropolymer is selected from the group of fluorourethanes, fluoro(meth)acrylates, fluorosilanes, and fluoropolymers, wherein the fluoropolymers incorporate greater than four monomer units of hexafluoropropylene oxide (HFPO).
3. The method of embodiment 2 wherein the fluoropolymer is a compound of Formula (I):

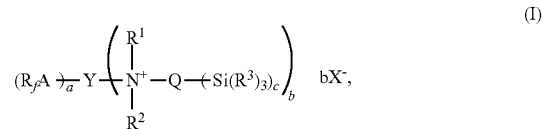

wherein:
a, b, and c are independently integers from 1 to 3;
$R_f$ is a perfluorinated ether group;
A is a linking group (preferably having the formula —$C_dH_{2d}ZC_gH_{2g}$—, wherein d and g are independently integers from 0 to 10, and Z is selected from the group of a covalent bond, a carbonyl group, a sulfonyl group, a carboxamido group, a sulfonamido group, an iminocarbonyl group, an iminosulfonyl group, an oxycarbonyl group, a urea group, a urethane group, a carbonate group, and a carbonyloxy group);
Y is a bridging group (preferably having 1 to 10 carbon atoms, and a valency from 2 to 6) comprising at least one of an alkylene group, an arylene group, or a combination thereof (e.g., an alkarylene or an aralkylene group));
Q is a connecting group (preferably having 1 to 10 carbons atoms, and a valency from 2 to 4) comprising at least one of an alkylene group, an arylene group, or a combination thereof (e.g., an alkarylene or an aralkylene group));
$R^1$ and $R^2$ are independently selected from the group of a hydrogen atom, an alkyl group, an aryl group, and a combination thereof (e.g., an aralkyl or an alkaryl group, and preferably an aralkyl group);
each $R^3$ is independently selected from the group of hydroxy groups, alkoxy groups, acyl groups, acyloxy groups, halo groups, and polyether groups; and
$X^-$ is a counter ion selected from the group of inorganic anions, organic anions, and combinations thereof.

4. The method of embodiment 1 wherein the fluoropolymer of the coating composition comprises at least one perfluorinated (C4-C6)alkyl group.
5. The method of claim 4 wherein the fluoropolymer comprises one or more urethane oligomers of at least two polymerized units, wherein said oligomers comprise the reaction product of components comprising:
   (a) one or more polyfunctional isocyanate compounds;
   (b) one or more polyols;
   (c) one or more monoalcohols selected from the group of fluorocarbon monoalcohols, optionally substituted long-chain hydrocarbon monoalcohols, and mixtures thereof; and
   (d) one or more silanes of the following Formula (II):

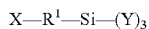

wherein:
   X is an isocyanate reactive group selected from —NH$_2$, —SH, —OH, or —NRH, where R is selected from the group of phenyl, straight and branched aliphatic, alicyclic, and aliphatic ester groups;
   R$^1$ is an alkylene, heteroalkylene, aralkylene, or heteroaralkylene group; and
   each Y is independently a hydroxyl, a hydrolyzable moiety selected from the group of alkoxy, acyloxy, heteroalkyloxy, heteroacyloxy, halo, and oxime, or a non-hydrolyzable moiety selected from the group of phenyl, alicyclic, straight-chain aliphatic, and branched-chain aliphatic;
   wherein at least one Y is a hydrolyzable moiety.
6. The method of any one of embodiments 1 through 5 wherein the water-soluble polymer is selected from the group of a cellulose, polyvinyl alcohol, poly(meth)acrylic acid, polylactic acid, starch, ethylene vinyl alcohol, polyethylene glycol, polyvinyl acetate, polyvinylpyrrolidone, and combinations thereof.
7. The method of any one of embodiments 1 through 6 wherein the water-soluble polymer has a weight average molecular weight of 9,000 to 124,000 Daltons.
8. The method of embodiment 7 wherein the water-soluble polymer has a weight average molecular weight of 9,000 to 45,000 Daltons.
9. The method of embodiment 8 wherein the water-soluble polymer has a weight average molecular weight of 9,000 to 10,000 Daltons.
10. The method of any one of embodiments 1 through 9 wherein the fluoropolymer is present in an amount of 0.1 wt-% to 1.0 wt-%.
11. The method of embodiment 10 wherein the fluoropolymer is present in an amount of 0.1 wt-% to 0.5 wt-%.
12. The method of embodiment 11 wherein the fluoropolymer is present in an amount of 0.1 wt-% to 0.2 wt-%.
13. The method of any one of embodiments 1 through 12 wherein the water-soluble polymer is present in an amount of 10 wt-% to 20 wt-%.
14. The method of embodiment 13 wherein the water-soluble polymer is present in an amount of 10 wt-% to 15 wt-%.
15. The method of embodiment 14 wherein the water-soluble polymer is present in an amount of 10 wt-% to 12 wt-%.
16. The method of any one of embodiments 1 through 15 wherein the composition further comprises a water-miscible organic solvent.
17. The method of embodiment 16 wherein the water-miscible organic solvent is selected from the group of isopropanol, ethanol, methanol, n-butanol, dipropylene glycol monomethyl ether, dipropylene glycol, and combinations thereof
18. The method of any one of embodiments 1 through 17 wherein the composition further comprises an additive selected from the group of a fragrance, preservative, pigment, stabilizer, anti-foaming agent, anti-soiling agent, and combinations thereof.
19. The method of any one of embodiments 1 through 18 wherein the composition is in two parts, wherein one part comprises the fluoropolymer, one part comprises the water-soluble polymer, and one or both parts includes the water.
20. The method of any one of embodiments 1 through 19 in the form of a sprayable composition.
21. A multi-layered film comprising:
   a support liner;
   a layer comprising a water-soluble adhesive disposed on a surface of the liner;
   a layer comprising a water-soluble polymer disposed directly on the layer comprising the water-soluble adhesive; and
   a layer comprising a fluoropolymer;
   wherein the layers are arranged such that the layer comprising the fluoropolymer forms an outermost layer, or the water-soluble polymer and the fluoropolymer are mixed together to form one layer as an outermost layer.
22. The film of embodiment 21 wherein the water-soluble adhesive is a pressure sensitive adhesive.
23. The film of embodiment 22 wherein the pressure sensitive adhesive comprises a tackified acrylate pressure sensitive adhesive.
24. The film of any one of embodiments 21 through 23 wherein the layer comprising the fluoropolymer has a thickness of 4 microns to 8 microns.
25. The film of any one of embodiments 21 through 24 wherein the layer comprising the water-soluble polymer has a thickness of 50 microns to 110 microns.
26. The film of embodiment 25 wherein the layer comprising the water-soluble adhesive has a thickness of 22 microns to 25 microns.
27. The film of any one of embodiments 21 through 26 wherein the support liner has a thickness of 120 microns to 125 microns.
28. The film of any one of embodiments 21 through 27 further comprising a protective liner disposed on the outermost layer.
29. The film of embodiment 28 wherein the protective layer has a thickness of 25 microns to 60 microns.
30. The film of any one of embodiments 21 through 29 wherein the fluoropolymer is selected from the group of fluorourethanes, fluoro(meth)acrylates, fluorosilanes, and fluoropolymers, wherein the fluoropolymers incorporate greater than four monomer units of hexafluoropropylene oxide (HFPO).
31. The film of embodiment 30 wherein the fluoropolymer is a compound of Formula (I):

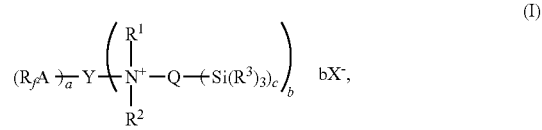

wherein:

a, b, and c are independently integers from 1 to 3;
$R_f$ is a perfluorinated ether group;
A is a linking group (preferably having the formula —$C_dH_{2d}ZC_gH_{2g}$—, wherein d and g are independently integers from 0 to 10, and Z is selected from the group of a covalent bond, a carbonyl group, a sulfonyl group, a carboxamido group, a sulfonamido group, an iminocarbonyl group, an iminosulfonyl group, an oxycarbonyl group, a urea group, a urethane group, a carbonate group, and a carbonyloxy group);
Y is a bridging group (preferably having 1 to 10 carbon atoms, and a valency from 2 to 6) comprising at least one of an alkylene group, an arylene group, or a combination thereof (e.g., an alkarylene or an aralkylene group));
Q is a connecting group (preferably having 1 to 10 carbons atoms, and a valency from 2 to 4) comprising at least one of an alkylene group, an arylene group, or a combination thereof (e.g., an alkarylene or an aralkylene group));
$R^1$ and $R^2$ are independently selected from the group of a hydrogen atom, an alkyl group, an aryl group, and a combination thereof (e.g., an aralkyl or an alkaryl group, and preferably an aralkyl group);
each $R^3$ is independently selected from the group of hydroxy groups, alkoxy groups, acyl groups, acyloxy groups, halo groups, and polyether groups; and
$X^−$ is a counter ion selected from the group of inorganic anions, organic anions, and combinations thereof.

32. The film of any one of embodiments 21 throuh 29 wherein the fluoropolymer comprises at least one perfluorinated (C4-C6)alkyl group.

33. The film of embodiment 32 wherein the fluoropolymer comprises one or more urethane oligomers of at least two polymerized units, wherein said oligomers comprise the reaction product of components comprising:
(a) one or more polyfunctional isocyanate compounds;
(b) one or more polyols;
(c) one or more monoalcohols selected from the group of fluorocarbon monoalcohols, optionally substituted long-chain hydrocarbon monoalcohols, and mixtures thereof; and
(d) one or more silanes of the following Formula (II):

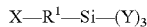

wherein:
X is an isocyanate reactive group selected from —$NH_2$, —SH, —OH, or —NRH, where R is selected from the group of phenyl, straight and branched aliphatic, alicyclic, and aliphatic ester groups;
$R^1$ is an alkylene, heteroalkylene, aralkylene, or heteroaralkylene group; and
each Y is independently a hydroxyl, a hydrolyzable moiety selected from the group of alkoxy, acyloxy, heteroalkyloxy, heteroacyloxy, halo, and oxime, or a non-hydrolyzable moiety selected from the group of phenyl, alicyclic, straight-chain aliphatic, and branched-chain aliphatic;
wherein at least one Y is a hydrolyzable moiety.

34. The film of any one of embodiments 21 through 33 wherein the water-soluble polymer is selected from the group of a cellulose, polyvinyl alcohol, poly(meth)acrylic acid, polylactic acid, starch, ethylene vinyl alcohol, polyethylene glycol, polyvinyl acetate, polyvinylpyrrolidone, and combinations thereof.

35. The film of any one of embodiments 21 through 34 wherein the water-soluble polymer has a weight average molecular weight of 9,000 to 124,000 Daltons.

36. The film of embodiment 35 wherein the water-soluble polymer has a weight average molecular weight of 9,000 to 45,000 Daltons.

37. The film of embodiment 36 wherein the water-soluble polymer has a weight average molecular weight of 9,000 to 10,000 Daltons.

EXAMPLES

Objects and advantages of this disclosure are further illustrated by the following examples, but the particular materials and amounts thereof recited in these examples, as well as other conditions and details, should not be construed to unduly limit this disclosure.

The following examples are merely for illustrative purposes and are not meant to limit in any way the scope of the appended claims. All parts, percentages, ratios, and the like in the examples are by weight, unless noted otherwise. Unit abbreviations used include min=minutes, h=hours, g=grams, wt=weight, cm=centimeter. Unless otherwise stated, materials were obtained from Sigma-Aldrich, Milwaukee, Wis.

Water Solubility Testing of Polymers

A sample of 0.1-0.15 grams of the polymer is used to produce a 10% aqueous solution and this entire solution is then coated with a MEYER ROD #5 (Eureka Techno Services, India) onto an as supplied 5 cm by 13 cm (2 inch by 5 inch) stainless steel panel (commercially available from Chem Instruments Inc., Fairfield, Ohio). The panel is then completely submerged in 50° C. water while standing motionless in a covered Petri dish. The panel is checked periodically and when the film is completely removed the time is recorded. A water-soluble polymer is one that is completely removed from the panel within 30 minutes. The definition also requires that the polymer is able to coat the panel with a continuous uniform film.

Six polymers were tested for water solubility with results in Table 1.

TABLE 1

| Polymer Description | Time required to completely remove the film at 50° C. | Water Soluble? |
|---|---|---|
| PVA granules commercially available from Sigma Aldrich (MW 9,000-10,000 grams/mole | 6-7 minutes | Yes |
| PVA powder commercially available from SD Fine-Chem LtD., Mumbai, India (85,000-124,000 grams/mole/86-89% hydrolyzed) | 11-12 minutes | Yes |
| PSA Adhesive (Example 7 of U.S. Pat. No. 3,865,770. n-butyl acrylate/acrylic acid (75/25 wt. %) | 20 minutes | Yes |

TABLE 1-continued

| Polymer Description | Time required to completely remove the film at 50° C. | Water Soluble? |
|---|---|---|
| Phenolic resin commercially available from 3M Company, St. Paul, MN as 3M STAIN BLOCKER CONCENTRATE FX-369 | Would not coat continuously or uniformly on the steel panel. Powders off. | No |
| Stain resistant agent. Blend of phenolic resin and methacrylic resin commercially available from 3M Company as 3M STAIN BLOCKER FC-661 | Would not coat continuously or uniformly on the steel panel. Powders off. | No |
| Methacrylic resin commercially available from 3M Company as Sam-83/FC-672 | Would not coat continuously or uniformly on the steel panel. Powders off. | No |

Surface Tension Testing

Using a digital analytical balance, the samples were added to a 8-oz wide mouth glass jar and then diluted with deionized water to at total weight of 100.00 grams to give an overall concentration of 0.1 wt. % solids. Samples were stirred for 5 minutes with a magnetic stir bar and a 20-ml aliquot of each sample was then poured into an snap cap jar and allowed to sit for 30 minutes before measurement. Static surface tension measurements were run using a Kruss (Hamburg, Germany) Model K12 tensiometer at 20° C. Four samples were tested with the following results: an anionic fluoropolymer (a fluorourethane silane polymer, commercially available from 3M Company, St. Paul, Minn. under the trade designation "SRC-220" as a 15 wt % solids), 45.0 dynes/cm (0.045 N/m); a cationic fluoropolymer (an aqueous cationic fluorinated ether silane polymer dispersion as described in Example 1 of U.S. Pat. No. 8,080,170 originally supplied as 50 wt % solids), 19.7 dynes/cm (0.0197 N/m); a polymeric nonionic fluorosurfactant commercially available from 3M Company under the trade designation "FC-4430", 20.8 dynes/cm (0.0208 N/m); and another polymeric nonionic fluorosurfactant $(CF_3(CF_2)_4SO_2N(CH_3)(CH_2CH_2O)_{7.5}OCH_3)$, 21.2 dynes/cm (0.0212 N/m).

Sample Preparation and Soil Testing

Samples were prepared using as supplied 5 cm by 13 cm (2 inch by 5 inch) stainless steel panels (commercially available from Chem Instruments Inc., Fairfield, Ohio). After the film or coating was applied the samples were exposed to heated mustard oil (purchased as DHARA from Mother Dairy, India) at 200° C. for 2 hours. The exposure consisted of heating the oil in an electrically heated oil bath (10 cm in diameter by 7 cm in height) with the panel placed directly on the top of the oil bath. A sample of 0.5 g or 1 g (depending on test) of roadside clay dirt was ground in a mortar and pestle and sprinkled evenly over the oil exposed panel. The panel was tapped five times on a table to dislodge loose dirt. This was the method used for all examples except Comparative Examples G and H and Examples 8 and 9.

Comparative Example A and Examples 1 and 2

Two panels as described under Sample Preparation and Soil Testing were each divided into two halves, one half remaining uncoated and the other half coated The coatings consisted of first applying a coating of PVA (polyvinylalcohol) with a Meyer rod. No added adhesive was used. The PVA was obtained from SD Fine-Chem Ltd., Mumbai, India (85,000-124,000 MW/86-89% hydrolyzed). These panels were then sprayed from an aerosolized sprayer with either an anionic fluoropolymer (SRC-220 dispersion as supplied (a fluorourethane silane polymer, commercially available from 3M Company, St. Paul, Minn.)) or a cationic fluoropolymer (an aqueous cationic fluorinated ether silane polymer dispersion as described in Example 1 of U.S. Pat. No. 8,080, 170). The coated sample was dried/cured at 25° C. for 24 h. The dried weight of PVA plus SRC-220 was less than 0.1 g.

The panels were exposed to the heated oil, 0.5 g of dirt was sprinkled uniformly over each half and the panels shaken as described under Sample Preparation and Soil Testing. The dirt removed was weighed to determine dirt remaining The weight of dirt remaining is shown in Table 2, which shows that the coated surfaces took about 7-8 times less dirt (which reflects the amount of oil adhered) than the comparative control sample. The easy cleanability/removability was checked by dipping the samples in a beaker full of water for several minutes. The control remained dirty whereas the coated panels cleaned easily.

TABLE 2

| Example | Description | Grams dirt remaining (%) |
|---|---|---|
| Comparative Example A | Control with no coating | 0.290 (58%) |
| Example 1 | Coated with anionic fluorpolymer on top of PVA | 0.040 (8%) |
| Example 2 | Coated with cationic fluoropolymer on top of PVA | 0.037 (7%) |

Comparative Example B and Examples 3-6

These examples constituted blends of fluoropolymer and PVA that were sprayed onto the panels as one layer. Panels were made up and tested as in Comparative Example A and Examples 1 and 2 above except that full panels were used instead of being divided into halves with a control. The control with no coating (Comparative Example B) was also run on a full panel and gave similar results as Comparative Example 1 (60% dirt remaining vs. 58%).

Example 3

This example consisted of a blend of 50 g of a 10% solids by weight PVA powder from SD Fine-Chem LtD., Mumbai, India (85,000-124,000 MW/86-89% hydrolyzed) with 0.35 g anionic fluoropolymer (SRC-220 dispersion as supplied (a fluorourethane silane polymer, commercially available from 3M Company, St. Paul, Minn.)) mixed with a glass rod for 30 min with continuous hand stirring and the blend sprayed onto the uncoated steel panel described under Sample Preparation and Soil Testing. After drying the total weight of the coatings was found to be less than 0.1 g. The panels were dried at 25° C. for 2 h. Dirt (1.0 gram) was used for the full panel. The results are in Table 3.

Example 4

This example was identical to Example 3 but the panels were dried at 130° C. for 3 min before further standing at 25° C. for 15 min. The results are in Table 3.

Example 5

This example was identical to Example 3 except ten times as much SRC-220 was used (3.5 g). The results are in Table 3.

Example 6

This example was identical to Example 5 but was dried at 130° C. for 3 min before further standing at 25° C. for 15 min. The results are in Table 3.

TABLE 3

| Example | Description | Drying temperature (° C.) | Grams dirt remaining (%) |
|---|---|---|---|
| Comparative Example B | No coating | 25 | 0.60 (60%) |
| Example 3 | Blend of PVA and fluoropolymer | 25 | 0.32 (32%) |
| Example 4 | Blend of PVA and fluoropolymer | 130 | 0.10 (10%) |
| Example 5 | Blend of PVA and fluoropolymer | 25 | 0.32 (32%) |
| Example 6 | Blend of PVA and fluoropolymer | 130 | 0.12 (12%) |

Comparative Examples C-F and Example 7

Example 7 and Comparative Examples C-E demonstrate the importance of the combination of the fluoropolymer and the PVA in reducing the dirt picked up and increasing the dirt removed after cleaning with water. Comparative Example F demonstrates that the fluoropolymer is preferably not a fluorosurfactant. Results in Table 4.

Example 7 constituted a blend of 0.35 g SRC-220 and 50 g of a 10% solids by weight PVA powder from SD Fine-Chem LtD., Mumbai, India (85,000-124,000 MW/86-89% hydrolyzed) that was sprayed as one layer onto the full steel panels described under Sample Preparation and Soil Testing. The coating was then dried at 25° C. for 24 h. The total dry weight sprayed on the panel was found to be about 0.04 g. The panel was then exposed to oil, 1.0 g of dirt was sprinkled uniformly over the panel, the panel tapped five times on a table and the % of dirt remaining determined as in Examples 3-6. In this example, however, the panel was further dipped in a beaker of water and allowed to stand motionless for 20 minutes and the % cleaning determined Percent (%) cleaning was defined as 100×(grams dirt removed after the 20 minutes of dipping in water)/the grams dirt remaining on the panel after shaking).

Comparative Example C was a control with no coating. Comparative Example D was identical to Example 7 except no PVA was used. The SRC-220 in Comparative Example D did not completely cover the surface of the panel as it was not possible to evenly coat the material on the panel. This helps explain the fact that Comparative Example D (fluoropolymer only) had 35% of the dirt remaining vs 11% for Example 7 (fluoropolymer blended with PVA which adhered and coated more easily). Comparative Example E was identical to Example 7 except no SRC-220 was used. Comparative Example F was identical to Example 7 except SRC-220 was replaced with a fluorosurfactant FC-4430 (commercially available from 3M Company, St. Paul, Minn.) at the same % solids.

TABLE 4

| Example | Description | Grams dirt remaining (%) | Grams dirt removed after 20 minutes in water (%) |
|---|---|---|---|
| Comparative Example C | No coating | 0.45 (45) | 0.030 (7) |
| Comparative Example D | Fluoropolymer but no PVA | 0.35 (35) | *0.039 (11) |
| Comparative Example E | PVA but no fluoropolymer | 0.37 (37) | 0.11 (30) |
| Comparative Example F | Fluoropolymer and PVA but fluoropolymer is a fluorosurfactant | 0.49 (49) | 0.12 (24) |
| Example 7 | Fluoropolymer and PVA | 0.11 (11) | 0.07 (64) |

*Coating did not completely cover the surface of the panel as it was not possible to evenly coat the material on the panel Comparative Examples G-H and Examples 8-9

These examples demonstrate the advantage of an adhesive layer in not only allowing ease of applying a multilayer laminate but also in the ability to apply a laminate on a contaminated surface and subsequently remove that contamination. No fluoropolymer was used for simplicity to demonstrate the effect of the adhesive.

The panels described under Sample Preparation and Soil Testing were first coated by evenly spreading with fingers 0.5 g of a wax to simulate contaminated panels (blend of molybdenum bisulfite, graphite, PTFE, silicone and synthetic oils commercially available from Molygraf, India under the trade designation FB-300). After the wax was coated, a PVA film with adhesive was laminated by hand using a squeegee onto the wax surface. Two PVA adhesive films (A and B) were used. The PVA A film was commercially available as film from Kuraray (Houston, Tex.) under the trade designation POVAL H (35 micron thickness). The PVA B film was prepared from commercially available as granules (100 micron dried film) from Sigma Aldrich (MW 9,000-10,000 grams/mole), which were dissolved in water with magnetic stirring for 30 minutes at 25° C. to make a 10% by weight solution. Film was prepared from this solution using a lab scale bar coater on a polyethylene backing and was allowed to dry overnight at 25° C. The adhesive for both films A and B was a water dispersible acrylate partially neutralized with alkanolamine combined with a tackifier. The pressure sensitive adhesive (PSA) adhesive used was that of Example 7 of U.S. Pat. No. 3,865,770 with the following modifications: methyl diethanolamine was used in place of DMP 400 and the tackifier was used at 72 parts per hundred parts copolymer instead of 100 parts. PVA film (122 g) was cast separately and then 27 grams of the adhesive was laminated on a liner. Then the PVA film was laminated onto the adhesive. The PVA plus adhesive laminate was then taken off from the liner and applied onto the greasy panels using a squeegee. The panels were then dried at 130° C. for 3 min and 25° C. for 14 h. The panels were then placed into an ultrasonic bath (EQ- UITRON, Medica Instrument Company, Mumbai, India; Model 8442.150.5, Frequency 53 HZ) at 25° C. for 10 min and the weight of the dried panels determined (dried thickness of adhesive was 28-32 microns/26.8 grams). Comparative Examples G-H did not have adhesive whereas Examples 8-9 had adhesive. Examples 8 and 9 differed only in the source and type of PVA as did Comparative Examples G and H. The results are in Table 5.

TABLE 5

| Example | Description | Wax and adhesive removed (%) |
| --- | --- | --- |
| Comparative Example G | PVA A but no adhesive | 27 |
| Example 8 | PVA A and adhesive | 97, 91 (duplicate samples) |
| Comparative Example H | PVA B but no adhesive | 27 |
| Example 9 | PVA B and adhesive | 88, 85 (duplicate samples) |

Examples 10-12

These blend examples were done exactly as in Example 3 but using the fluoropolymers listed in Table 6 in a blend with the PVA used in Example 3. The blend contained 0.1% fluorochemical solids by weight. All three fluoropolymers are commercially available from 3M Company, St. Paul, Minn. The blend was sprayed onto the uncoated steel panel described under Sample Preparation and Soil Testing. After drying the total weight of the coatings was found to be less than 0.1 g. The panels were dried at 25° C. for 2 h. Dirt (1.0 gram) was used for the full panel. Drying protocol was 130° C. for 3 m followed by 25° C. for 15 min.

TABLE 6

| Example | Description | Grams dirt remaining (%) |
| --- | --- | --- |
| Example 10 | Blend of PVA and PM-1396 (anionic fluorochemical urethane emulsion) | 0.23 (23%) |
| Example 11 | Blend of PVA and PM-4700 (anionic polyacrylate fluorochemical aqueous emulsion) | 0.24 (24%) |
| Example 12 | Blend of PVA and PM-490 (aqueous fluorochemical urethane emulsion) | 0.24 (24%) |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A method of treating a hard surface in a kitchen, the method comprising:
   providing a coating composition comprising:
      0.1 wt-% to 1.0 wt-% of a fluoropolymer selected from the group of fluorourethanes, fluoro(meth)acrylates, fluorosilanes, and fluoropolymers having greater than four monomer units of hexafluoropropylene oxide (HFPO); wherein the fluoropolymer is not a fluorosurfactant defined by a surface tension of greater than 25 dyne/cm for 0.1 wt-% of the fluoropolymer in water at 20° C.;
      10 wt-% to 20 wt-% of a water-soluble polymer having a weight average molecular weight of 9,000 to 124.000 Daltons; and
      80 wt-% to 90 wt-% water; wherein the weight percentages are based on the total weight of the coating composition;
   applying the coating composition to the hard surface in a kitchen to form a grease-repellant and water-soluble coating; and
   removing the coating with water after dirt collects on the coating.

2. The method according to claim 1 wherein the fluoropolymer is a compound of Formula (I):

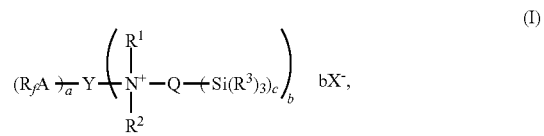

wherein:
   a, b, and c are independently integers from 1 to 3;
   $R_f$ is a perfluorinated ether group;
   A is a linking group;
   Y is a bridging group selected from the group of at least one of an alkylene group, an arylene group, or a combination thereof;
   Q is a connecting group selected from the group of at least one of an alkylene group, an arylene group, or a combination thereof;
   $R^1$ and $R^2$ are independently selected from the group of a hydrogen atom, an alkyl group, an aryl group, and a combination thereof;
   each $R^3$ is independently selected from the group of hydroxy groups, alkoxy groups, acyl groups, acyloxy groups, halo groups, and polyether groups; and
   $X^-$ is a counter ion selected from the group of inorganic anions, organic anions, and combinations thereof.

3. The method according to claim 1 wherein the fluoropolymer of the coating composition comprises at least one perfluorinated (C4-C6)alkyl group.

4. The method according to claim 3 wherein the fluoropolymer comprises one or more urethane oligomers of at least two polymerized units,
   wherein said oligomers comprise the reaction product of components comprising:
   (a) one or more polyfunctional isocyanate compounds;
   (b) one or more polyols;
   (c) one or more monoalcohols selected from the group of fluorocarbon monoalcohols, optionally substituted long-chain hydrocarbon monoalcohols, and mixtures thereof; and
   (d) one or more silanes of the following Formula (II):

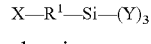

wherein:
      X is an isocyanate reactive group selected from $-NH_2$, $-SH$, $-OH$, or $-NRH$, where R is selected from the group of phenyl, straight and branched aliphatic, alicyclic, and aliphatic ester groups;
      $R^1$ is an alkylene, heteroalkylene, aralkylene, or heteroaralkylene group; and each Y is independently a hydroxyl, a hydrolyzable moiety selected from the group of alkoxy, acyloxy, heteroalkyloxy, heteroacyloxy, halo, and oxime, or a non-hydrolyzable moiety selected from the group of phenyl, alicyclic, straight-chain aliphatic, and branched-chain aliphatic;

wherein at least one Y is a hydrolyzable moiety.

5. The method according to claim 1 wherein the water-soluble polymer of the coating composition is selected from the group of a cellulose, polyvinyl alcohol, poly(meth)acrylic acid, polylactic acid, starch, ethylene vinyl alcohol, polyethylene glycol, polyvinyl acetate, polyvinylpyrrolidone, and combinations thereof.

6. The method according to claim 1 wherein the fluoropolymer is present in an amount of 0.1 wt-% to 0.5 wt-%, based on the total weight of the coating composition.

7. The method according to claim 1 wherein the coating composition further comprises a water-miscible organic solvent.

8. The method according to claim 7 wherein the water-miscible organic solvent is selected from the group of isopropanol, ethanol, methanol, n-butanol, dipropylene glycolmonomethyl ether, dipropylene glycol, and combinations thereof.

* * * * *